United States Patent
Green

(10) Patent No.: US 11,420,306 B2
(45) Date of Patent: Aug. 23, 2022

(54) RATCHET TOOL APPARATUS

(71) Applicant: John Green, Iredell, TX (US)

(72) Inventor: John Green, Iredell, TX (US)

( * ) Notice: Subject to any disclaimer, the term of this patent is extended or adjusted under 35 U.S.C. 154(b) by 490 days.

(21) Appl. No.: 16/221,515

(22) Filed: Dec. 16, 2018

(65) Prior Publication Data

US 2020/0189073 A1 Jun. 18, 2020

(51) Int. Cl.
*B25B 13/46* (2006.01)
*F16H 1/16* (2006.01)
*B25B 17/02* (2006.01)
*F16D 125/52* (2012.01)
*B25B 13/48* (2006.01)
*F16D 121/14* (2012.01)

(52) U.S. Cl.
CPC .......... *B25B 13/46* (2013.01); *B25B 13/481* (2013.01); *B25B 17/02* (2013.01); *F16H 1/16* (2013.01); *F16D 2121/14* (2013.01); *F16D 2125/52* (2013.01)

(58) Field of Classification Search
CPC ..................................................... B25B 13/46
USPC ............................................................ 81/62
See application file for complete search history.

(56) References Cited

U.S. PATENT DOCUMENTS

| | | | | | |
|---|---|---|---|---|---|
| 1,392,443 | A | * | 10/1921 | Petersen | B25B 13/505 81/111 |
| 2,897,704 | A | * | 8/1959 | Woods | B25B 23/1427 81/481 |
| 4,215,601 | A | * | 8/1980 | Mann | B25B 27/00 81/57.13 |
| 4,374,480 | A | * | 2/1983 | Diaz | B25B 13/481 74/421 R |
| 4,517,861 | A | * | 5/1985 | Stemberger | B25B 17/00 81/57.29 |
| 6,536,310 | B2 | * | 3/2003 | Goldfein | B25B 13/481 81/185 |

(Continued)

OTHER PUBLICATIONS

"Static." Merriam-Webster, Merriam-Webster, www.merriam-webster.com/dictionary/static - Retrieved Apr. 27, 2021 (Year: 2021).*

*Primary Examiner* — David B. Thomas
*Assistant Examiner* — Jonathan G Santiago Martinez
(74) *Attorney, Agent, or Firm* — Kimberly McLean, Esq.; McLean Law LLC

(57) ABSTRACT

A ratchet tool apparatus including an elongated tubular shaft member having a drive socket built into the shaft at a distal end and having a worm screw gear attached to the shaft at a proximate end, a worm wheel having mating teeth members that mesh with the worm screw gear, a socket receiving orifice for receiving one of a plurality of socket attachments, a switch mechanism that is manually switched between a left directional mode of operation, a right directional mode of operation and a free spin mode of operation, the switch mechanism including a cover; a plurality of sealed bearings attached to the shaft member to stabilize the motion of the shaft member, and a housing unit having a cavity in which is mounted the elongated shaft member, the worm wheel, the worm screw gear, the socket receiving orifice, the switch mechanism, and the plurality of sealed bearings. The housing unit includes a handle region and a head region, the handle region has a L shape and includes a lever member.

10 Claims, 2 Drawing Sheets

(56) References Cited

U.S. PATENT DOCUMENTS

2003/0172780 A1* 9/2003 Newell ................ B25B 13/481
 81/57.29
2010/0064858 A1* 3/2010 Kinskey ................ B25B 13/16
 81/63.2

* cited by examiner

RATCHET TOOL APPARATUS

FIELD OF THE INVENTION

Embodiments described herein generally relate to mechanical tools, and more particularly to a ratchet tool apparatus.

BACKGROUND OF THE INVENTION

When working in areas such as engine compartments or enclosed spaces, it can sometimes be extremely difficult to get sockets into tight places. While open face wrenches fit around a fastener instead of over it, so an individual can slip a wrench into an area where there isn't room for a socket, open faced wrenches do not allow for efficient and quick removal of fasteners. Hence, it is desirable to provide an easy and rapid way to extract hard to reach bolt or nuts in tight places.

BRIEF DESCRIPTION OF THE DRAWINGS

The various advantages of the embodiments of the present disclosure will become apparent to one skilled in the art by reading the following specification and appended claims, and by referencing the following drawings, in which:

SUMMARY OF THE INVENTION

Exemplary embodiments disclosed herein describe a ratchet tool apparatus. The tool includes an elongated tubular shaft member having a drive socket built into the shaft at a distal end and having a worm screw gear attached to the shaft at a proximate end, a worm wheel having mating teeth members that mesh with the worm screw gear, a socket receiving orifice for receiving one of a plurality of socket attachments, a switch mechanism that is manually switched between a left directional mode of operation, a right directional mode of operation and a free spin mode of operation, the switch mechanism including a cover, a plurality of sealed bearings attached to the shaft member to stabilize the motion of the shaft member, and a housing unit having a cavity in which is mounted the elongated shaft member, the worm wheel, the worm screw gear, the socket receiving orifice, the switch mechanism, and the plurality of sealed bearings, the housing unit including a handle region and a head region, the handle region having a L shape and including a lever member.

In some exemplary embodiments, the handle region includes an elongated horizontal region and a vertical region.

In some exemplary embodiments, the vertical region of the handle includes the lever member.

In some exemplary embodiments, the lever member provides increased torque and protection of a user's hands and fingers.

In some exemplary embodiments, the left directional mode of operation is a manual mode of operation to loosen a fastener.

In some exemplary embodiments, the right directional mode of operation is a manual mode of operation to tighten a fastener.

In some exemplary embodiments, the free spin mode of operation allows a driving device attached to the drive socket to tighten or loosen a fastener.

In some exemplary embodiments, the socket receiving orifice is configured to receive a series of sockets ranging in sizes.

In some exemplary embodiments, the socket receiving orifice has a female hexagonal receiving orifice and is configured to receive a male socket male.

In some exemplary embodiments, the housing unit is made of milled steel.

DETAILED DESCRIPTION

Figure 1A:
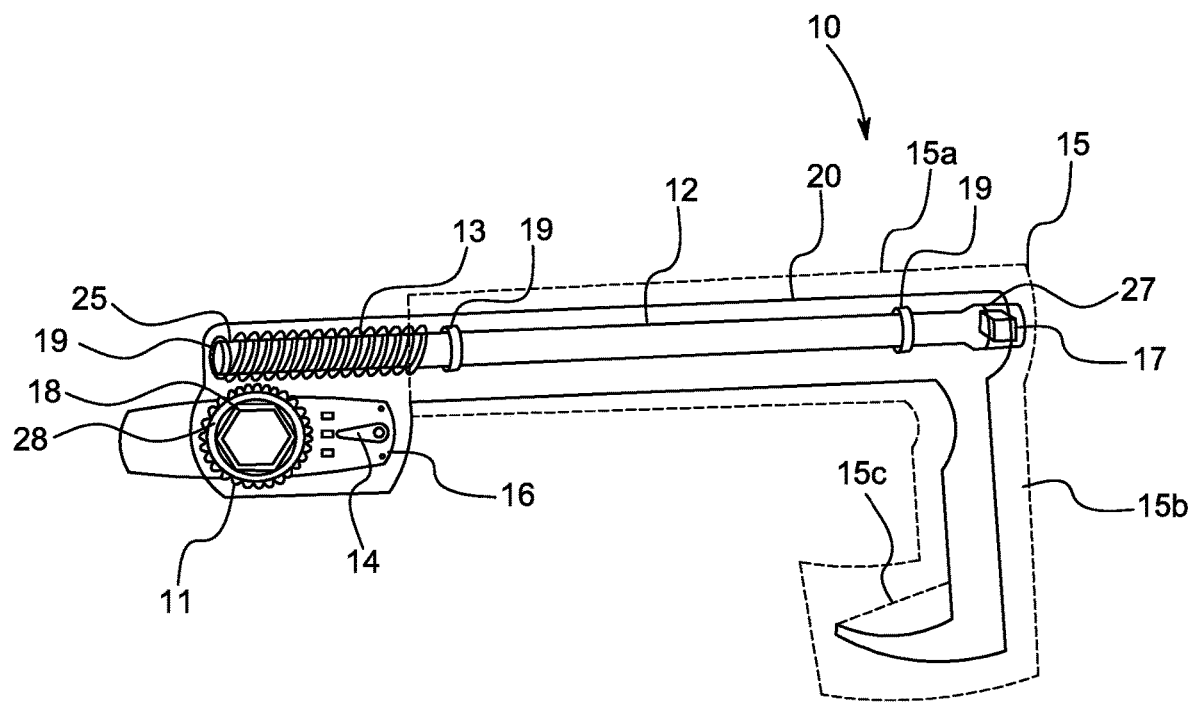
FIG. 1A shows an exemplary view of a ratchet tool apparatus according to an embodiment of the present disclosure.

The present disclosure relates to a ratchet tool apparatus for quickly removing nuts and bolts in tight spaces. As illustrated in FIG. 1A, the ratchet tool apparatus 10 includes a housing unit 20 having an interior cavity area which houses a tubular shaft member 12, a worm screw gear 13, a plurality of sealed bearings 19, a worm wheel 11, a socket receiving orifice 18, a switch mechanism 14, and a switch cover 16. The housing unit may be made of any suitable material. In a preferred embodiment, the housing unit is made of milled steel.

Figure 1B:
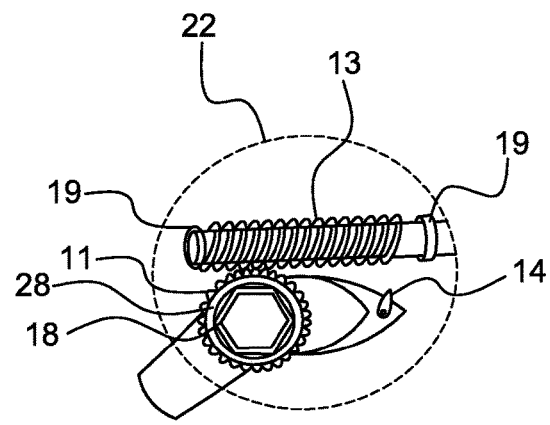
FIG. 1B shows an exploded view of a head region of the ratchet tool apparatus without a switch cover according to an embodiment of the present disclosure.

The housing unit includes a handle region 15 and a head region 22. The handle region is the area where a user may place his/her hands when operating the tool. The head region is the region that interfaces with a fastener to remove or install the fastener. FIG. 1B shows the head region 22 of the housing unit excluding a switch cover 16.

The handle region 15 is L shaped and includes an elongated horizontal region 15a and a vertical region 15b including a lever member 15c. The horizontal region of the handle may be any suitable length. In a preferred embodiment, the horizontal region of the handle is 12 inches. The elongated horizontal region protects a user's hands and fingers while using the tool. A user may place his/her hands a far distance away from the head region while inserting the ratchet tool apparatus in a tight space.

The vertical region 15b of the handle provides more protection for a user's hands and fingers when more of the tool apparatus needs to be inserted in a tight space to remove or install a fastener. The lever member 15c provides increased torque when trying to remove or install a fastener. The vertical region of the handle may be any suitable length. In a preferred embodiment, the vertical region of the handle is 6 inches.

The tubular shaft member 12 includes a drive socket 17 at a distal end 27 of the shaft member for interfacing with a driving unit, such as, for example, a wireless screw gun. The tubular shaft member has a worm screw gear attached to the shaft at a proximate end 25 of the shaft member. The shaft member may be made of any suitable material, such as, for example, metal.

A plurality of sealed bearings 19 are attached to the tubular shaft member 12 for stabilizing the shaft and for giving the shaft more spin when operating in a free spin mode. The plurality of sealed bearings are circular in shape and may be made of any suitable material, such as, for example, metal.

Figure 2:
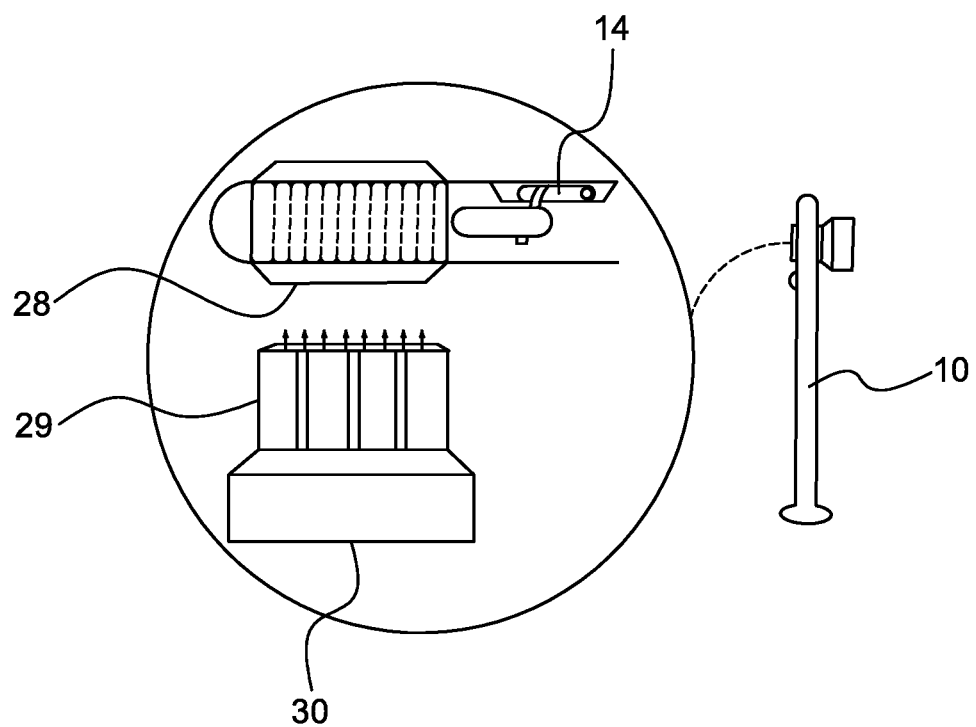
FIG. 2 shows an exemplary view of a female socket receiving orifice and a male socket head according to an embodiment of the present disclosure.

The worm wheel 11 includes mating teeth that mesh with the worm screw gear 13 to turn a socket attached to the socket receiving orifice 18. As illustrated in FIG. 2, the socket receiving orifice 18 is a female socket mating end 28 which receives a male socket head 29. The female end of the socket head 30 is attached to a fastener for tightening or loosening. The socket receiving orifice is adapted to receive interchangeable socket heads so long as the male socket has a hexagonal mating head.

The switch mechanism 14 includes a switch cover 16 which identifies the different modes of operation. Any type of suitable switch mechanism may be used. In a preferred embodiment, the switch mechanism is a toggle switch including a toggle element that is provided on top of the switch cover to allow a user to manually switch between the different modes of operation. The switch mechanism allows the ratchet tool apparatus 10 to operate in a left directional mode (loosening), a right directional mode (tightening) and a free spin mode. The left directional mode and the right directional mode are manual modes of operation for breaking free a fastener or tightening a fastener. The free spin mode of operation allows a driving unit attached to the drive socket 17, such as, for example, a wireless screw gun, to tighten or loosen a fastener. The use of the driving tool provides rapid tightening or loosening of the fastener. FIG. 1A shows the switch in a free spin mode of operation. FIG. 1B shows the switch in a right directional mode of operation.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A ratchet tool apparatus comprising:
   an elongated tubular shaft member having a drive socket built into the shaft at a distal end and having a worm screw gear attached to the shaft at a proximate end;
   a worm wheel having mating teeth members that mesh with the worm screw gear;
   a socket receiving orifice for receiving one of a plurality of socket attachments;
   a switch mechanism that is manually switched between a left directional mode of operation, a right directional mode of operation and a free spin mode of operation, the switch mechanism including a cover;
   a plurality of sealed bearings attached to the shaft member to stabilize the motion of the shaft member; and
   a housing unit having a cavity in which is mounted the elongated shaft member, the worm wheel, the worm screw gear, the socket receiving orifice, the switch mechanism, and the plurality of sealed bearings, the housing unit including a static handle region relative to the housing unit and a head region formed into the housing unit, the handle region having a L shape and including a lever member, wherein the housing unit, handle region and head region are a unitary structure.

2. The apparatus of claim 1, wherein the handle region includes an elongated horizontal region and a vertical region.

3. The apparatus of claim 2, wherein the vertical region of the handle includes the lever member.

4. The apparatus of claim 3, wherein the lever member provides increased torque and protection of a user's hands and fingers.

5. The apparatus of claim 1, wherein the left directional mode of operation is a manual mode of operation to loosen a fastener.

6. The apparatus of claim 1, wherein the right directional mode of operation is a manual mode of operation to tighten a fastener.

7. The apparatus of claim 1, wherein the free spin mode of operation allows a driving device attached to the drive socket to tighten or loosen a fastener.

8. The apparatus of claim 1, wherein the socket receiving orifice is configured to receive a series of sockets ranging in sizes.

9. The apparatus of claim 8, wherein the socket receiving orifice has a female hexagonal receiving orifice and is configured to receive a male socket.

10. The apparatus of claim 1, wherein the housing unit is made of milled steel.

* * * * *